United States Patent
Philipp et al.

(10) Patent No.: US 12,229,926 B2
(45) Date of Patent: Feb. 18, 2025

(54) METHOD AND SYSTEM FOR DEBLURRING A BLURRED IMAGE

(71) Applicant: GM GLOBAL TECHNOLOGY OPERATIONS LLC, Detroit, MI (US)

(72) Inventors: Tzvi Philipp, Bet Shemesh (IL); Dan Levi, Ganei Tikvah (IL); Shai Silberstein, Ziona (IL)

(73) Assignee: GM Global Technology Operations LLC, Detroit, MI (US)

( * ) Notice: Subject to any disclaimer, the term of this patent is extended or adjusted under 35 U.S.C. 154(b) by 415 days.

(21) Appl. No.: 17/863,501

(22) Filed: Jul. 13, 2022

(65) Prior Publication Data
US 2024/0020797 A1    Jan. 18, 2024

(51) Int. Cl.
*G06T 5/73*    (2024.01)

(52) U.S. Cl.
CPC ...... *G06T 5/73* (2024.01); *G06T 2207/20081* (2013.01); *G06T 2207/20201* (2013.01)

(58) Field of Classification Search
CPC ............ G06T 5/73; G06T 2207/20081; G06T 2207/20201; G06T 2207/10048; G06T 5/20; G06T 2207/20084; G06T 5/60; G06T 5/50; G06T 2207/20024; G06N 3/08
See application file for complete search history.

(56) References Cited

U.S. PATENT DOCUMENTS

| | | | |
|---|---|---|---|
| 2022/0156892 A1 | 5/2022 | Slutsky | |
| 2023/0334622 A1* | 10/2023 | Jung | G06V 40/16 |

FOREIGN PATENT DOCUMENTS

| | | | | |
|---|---|---|---|---|
| CN | 106683055 A | * | 5/2017 | |
| CN | 112184587 A | * | 1/2021 | ............ G06N 3/045 |

OTHER PUBLICATIONS

Kong L, Dong J, Yang MH, Pan J. Efficient Visual State Space Model for Image Deblurring. arXiv preprint arXiv:2405.14343. May 23, 2024. (Year: 2024).*
Chen, Mingju, et al. "An efficient image deblurring network with a hybrid architecture." Sensors 23.16 (2023): 7260. (Year: 2023).*
Machine English Translation of (CN 106683055). (Year: 2017).*
Machine English Translation of (CN 112184587). (Year: 2021).*

* cited by examiner

*Primary Examiner* — Wassim Mahrouka
(74) *Attorney, Agent, or Firm* — Quinn IP Law

(57) ABSTRACT

A method for deblurring a blurred image includes dividing the blurred image into overlapping regions each having a size and an offset from neighboring overlapping regions along a first direction as determined by a period of a ringing artifact in the blurred image, or by obtained blur characteristics relating to the blurred image and/or attributable to the optical system, or by a detected cause capable of producing the blur characteristics, stacking the overlapping regions to produce a stacked output, wherein the overlapping regions are sequentially organized along the first direction, convolving the stacked output through a first convolutional neural network (CNN) to produce a first CNN output having reduced blur as compared to the stacked output, and assembling the first CNN output into a re-assembled image, and processing the re-assembled image through a second CNN to produce a deblurred image having reduced residual artifacts as compared to the re-assembled image.

20 Claims, 8 Drawing Sheets

METHOD AND SYSTEM FOR DEBLURRING A BLURRED IMAGE

INTRODUCTION

This disclosure relates to methods and systems for deblurring a blurred image.

Optical systems utilizing liquid crystal polarization grating (LCPG)-based camera systems offer the advantage of being steerable, and of being able to generate high-resolution images over large fields of view while utilizing sensors with relatively low resolution. However, the images generated by LCPG-based steerable cameras require image processing in order to render the images, and such images may suffer from blur, noise and other image artifacts caused by the camera's polarized gratings, which may compromise the use of such systems for perception-based tasks such as navigation, situational awareness and the like.

SUMMARY

According to one embodiment, a method for deblurring a blurred image captured by an optical system includes: dividing the blurred image into a plurality of overlapping regions each having a size and an offset from neighboring overlapping regions along a first direction, wherein the size and offset are determined by a period of a ringing artifact in the blurred image if the blurred image has been filtered, or by obtained blur characteristics relating to the blurred image and/or attributable to the optical system, or by a detected cause capable of producing the blur characteristics; stacking the plurality of overlapping regions to produce a stacked output, wherein the overlapping regions are sequentially organized along the first direction; convolving the stacked output through a first convolutional neural network (CNN) to produce a first CNN output having reduced blur as compared to the stacked output; and assembling the first CNN output into a re-assembled image.

In this embodiment, the offset between neighboring overlapping regions may be approximately equal to the period of the ringing artifact or a parameter derived from the blur characteristics, and the size of each overlapping region along the first direction may be approximately equal to or greater than the period of the ringing artifact or the parameter derived from the blur characteristics. Each of the overlapping regions in the stacked output may be processed in a respective separate channel in the first CNN, and the blur may be reduced in one dimension or in two dimensions.

The method may further include processing the re-assembled image through a second CNN to produce the deblurred image, wherein the deblurred image has reduced residual artifacts as compared to the re-assembled image. The first CNN may have a first number of channels and the second CNN may have a second number of channels that is different from the first number of channels. Optionally, the blurred image may be produced by an LCPG-based imaging system, and one or both of the first and second CNNs may utilize a U-net CNN structure. The residual artifacts may be produced by the step of convolving the stacked output through the first CNN, by the step of stacking the plurality of overlapping regions to produce the stacked output, or by both steps.

The method may also include filtering the blurred image through a Tikhonov filter, a Wiener filter or another filter before the dividing step, and may further include obtaining (i) the blur characteristics relating to the blurred image and/or attributable to the optical system and/or (ii) the cause capable of producing the blur characteristics. The dividing step may be performed by a dividing module, the stacking step may be performed by a stacking module, the convolving step may be performed by a convolving module, and the assembling step may be performed by an assembling module, wherein the dividing module, the stacking module, the convolving module and the assembling module may be operatively connected to form a deblurring CNN module. Additionally, the filtering step may be performed by a filtering module and the processing step may be performed by a processing module, wherein the deblurring CNN module may further include the filtering module and the processing module.

The method may further include training the deblurring CNN module by supervised training, wherein the supervised training may include: providing a database of non-blurred stock images; generating a synthetically blurred stock image corresponding to each non-blurred stock image using a blurring scheme; producing a deblurred stock image corresponding to each synthetically blurred stock image using the deblurring CNN module and a weighting scheme; comparing each deblurred stock image with the corresponding non-blurred stock image to determine a difference therebetween; and repeating the generating, producing and comparing steps utilizing varied blurring schemes and weighting schemes until the difference is minimized. Alternatively, the method may further include training the deblurring CNN module by discriminative training in a generative adversarial network (GAN), wherein the GAN includes a generator which provides one or more candidate data to a discriminator and wherein the discriminator receives the candidate data and domain data, wherein the discriminative training may include: providing a database of non-blurred stock images as the domain data; using the deblurring CNN module as the generator and supplying one or more deblurred images as the candidate data to the discriminator; and utilizing a deep neural network (DNN) as the discriminator, receiving the one or more deblurred images as the candidate data and the non-blurred stock images as the domain data, and discriminating between the candidate data and the domain data to produce discriminations therebetween; wherein the generator and the discriminator compete with each other in a zero-sum game of making adjustments to either the generator or the discriminator based on the discriminations until a predetermined degree of convergence is achieved between the generator and the discriminator.

According to another embodiment, a method for deblurring a blurred image captured by an optical system includes: (i) obtaining, by an obtaining module, blur characteristics relating to the blurred image and/or attributable to the optical system, and/or a cause capable of producing the blur characteristics; (ii) filtering, by a filtering module, the blurred image through a filter to produce a filtered image; (iii) dividing, by a dividing module, the filtered image into a plurality of overlapping regions each having a size and an offset from neighboring overlapping regions along a first direction, wherein the size and offset are determined by a period of a ringing artifact in the filtered image or by the obtained blur characteristics or by the detected cause; (iv) stacking, by a stacking module, the plurality of overlapping regions to produce a stacked output, wherein the overlapping regions are sequentially organized along the first direction; (v) convolving, by a convolving module, the stacked output through a first U-net convolutional neural network (CNN) to produce a first CNN output having reduced blur as compared to the stacked output; (vi) assembling, by an assembling module, the first CNN output into a re-assembled image; and (vii) processing, by a processing module, the re-assembled image through a second U-net CNN to produce a deblurred image having reduced residual artifacts as compared to the re-assembled image. Here, the filtering module, the dividing module, the stacking module, the convolving module, the assembling module, and the processing module are operatively connected to form a deblurring CNN module.

In this embodiment, the method may further include training the deblurring CNN module by supervised training, wherein the supervised training may include: providing a database of non-blurred stock images; generating a synthetically blurred stock image corresponding to each non-blurred stock image using a blurring scheme; producing a deblurred stock image corresponding to each synthetically blurred stock image using the deblurring CNN module and a weighting scheme; comparing each deblurred stock image with the corresponding non-blurred stock image to determine a difference therebetween; and repeating the generating, producing and comparing steps utilizing varied blurring schemes and weighting schemes until the difference is minimized. Alternatively, the method may further include training the deblurring CNN module by discriminative training in a generative adversarial network (GAN), wherein the GAN includes a generator which provides one or more candidate data to a discriminator and wherein the discriminator receives the candidate data and domain data, wherein the discriminative training may include: providing a database of non-blurred stock images as the domain data; using the deblurring CNN module as the generator and supplying one or more deblurred images as the candidate data to the discriminator; and utilizing a deep neural network (DNN) as the discriminator, receiving the one or more deblurred images as the candidate data and the non-blurred stock images as the domain data, and discriminating between the candidate data and the domain data to produce discriminations therebetween; wherein the generator and the discriminator compete with each other in a zero-sum game of making adjustments to either the generator or the discriminator based on the discriminations until a predetermined degree of convergence is achieved between the generator and the discriminator.

According to yet another embodiment, a system for deblurring a blurred image includes: an optical system including one or more cameras configured for capturing a plurality of images including the blurred image; an image signal processing module operatively connected with the optical system and configured for receiving the plurality of images including the blurred image from the optical system; and a deblurring convolutional neural network (CNN) module operatively connected with the image signal processing module and configured for deblurring the blurred image to produce a deblurred image therefrom, wherein the deblurring CNN module comprises: a dividing module configured for dividing the blurred image into a plurality of overlapping regions each having a size and an offset from neighboring overlapping regions along a first direction, wherein the size and offset are determined by a period of a ringing artifact in the blurred image if the blurred image has been filtered, or by obtained blur characteristics relating to the blurred image and/or attributable to the optical system, or by a detected cause capable of producing the blur characteristics; a stacking module configured for stacking the plurality of overlapping regions to produce a stacked output, wherein the overlapping regions are sequentially organized along the first direction; a convolving module configured for convolving the stacked output through a first convolutional neural network (CNN) to produce a first CNN output having reduced blur as compared to the stacked output; and an assembling module configured for assembling the first CNN output into a re-assembled image.

The system may further include a perception module operatively connected with the deblurring CNN module and configured for utilizing the deblurred image to arrive at one or more conclusions and/or to take one or more actions based on the deblurred image. Additionally, the system may include an obtaining module operatively associated with the optical system and/or the image signal processing module and configured for obtaining (i) blur characteristics relating to the blurred image and/or attributable to the optical system, and/or (ii) a cause capable of producing the blur characteristics. The deblurring CNN module may also include a filtering module configured for filtering the blurred image through a Tikhonov filter, a Wiener filter or another filter, and may further include a processing module configured for processing the re-assembled image through a second CNN to produce a second CNN output, such that the second CNN output has reduced residual artifacts as compared to the re-assembled image, wherein one or both of the first and second CNNs may utilize a U-net CNN structure.

The deblurring CNN module may be configured for supervised training, wherein the supervised training may include: providing a database of non-blurred stock images; generating a synthetically blurred stock image corresponding to each non-blurred stock image using a blurring scheme; producing a deblurred stock image corresponding to each synthetically blurred stock image using the deblurring CNN module and a weighting scheme; comparing each deblurred stock image with the corresponding non-blurred stock image to determine a difference therebetween; and repeating the generating, producing and comparing steps utilizing varied blurring schemes and weighting schemes until the difference is minimized. Alternatively, the deblurring CNN module may be configured for discriminative training in a generative adversarial network (GAN), wherein the GAN includes a generator which provides one or more candidate data to a discriminator and wherein the discriminator receives the candidate data and domain data, wherein the discriminative training may include: providing a database of non-blurred stock images as the domain data; using the deblurring CNN module as the generator and supplying one or more deblurred images as the candidate data to the discriminator; and utilizing a deep neural network (DNN) as the discriminator, receiving the one or more deblurred images as the candidate data and the non-blurred stock images as the domain data, and discriminating between the candidate data and the domain data to produce discriminations therebetween; wherein the generator and the discriminator compete with each other in a zero-sum game of making adjustments to either the generator or the discriminator based on the discriminations until a predetermined degree of convergence is achieved between the generator and the discriminator.

The above features and advantages, and other features and advantages of the present teachings are readily apparent from the following detailed description of some of the best modes and other embodiments for carrying out the present teachings, as defined in the appended claims, when taken in connection with the accompanying drawings.

DETAILED DESCRIPTION

Figure 3:
FIG. 3 is a deblurred version of the image of FIG. 2 after being processed by a deblurring CNN module according to the present disclosure.

Referring now to the drawings, wherein like numerals indicate like parts in the several views, a system 20 and method 100 for deblurring a blurred image 22 are shown and described herein.

Figure 2:
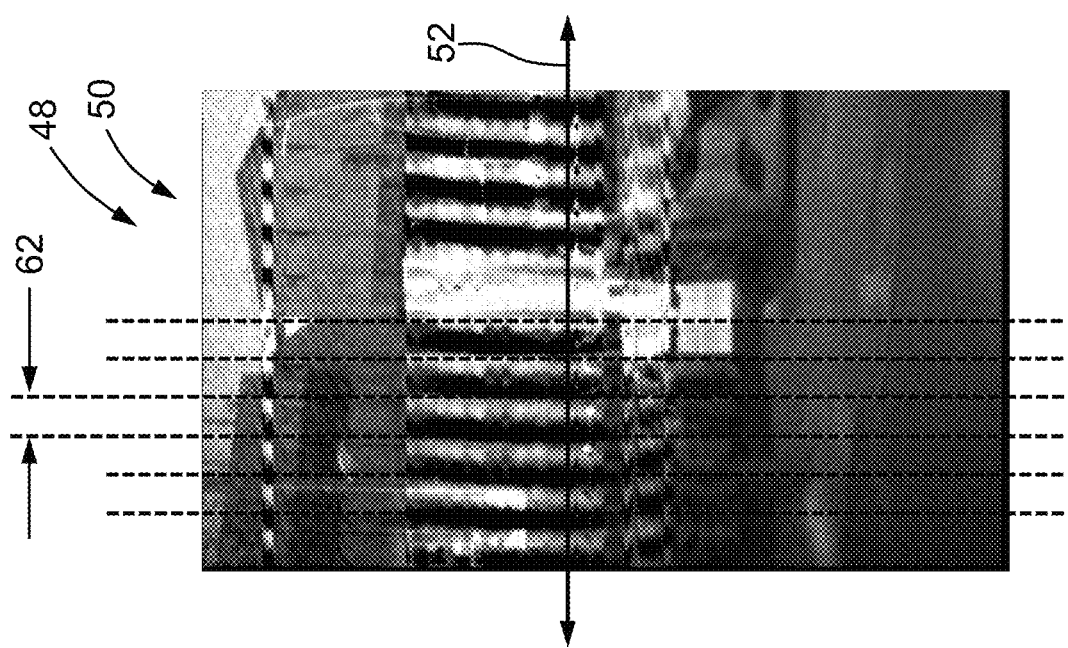
FIG. 2 is a filtered version of the image of FIG. 1 after being passed through a Tikhonov filter.
Figure 1:
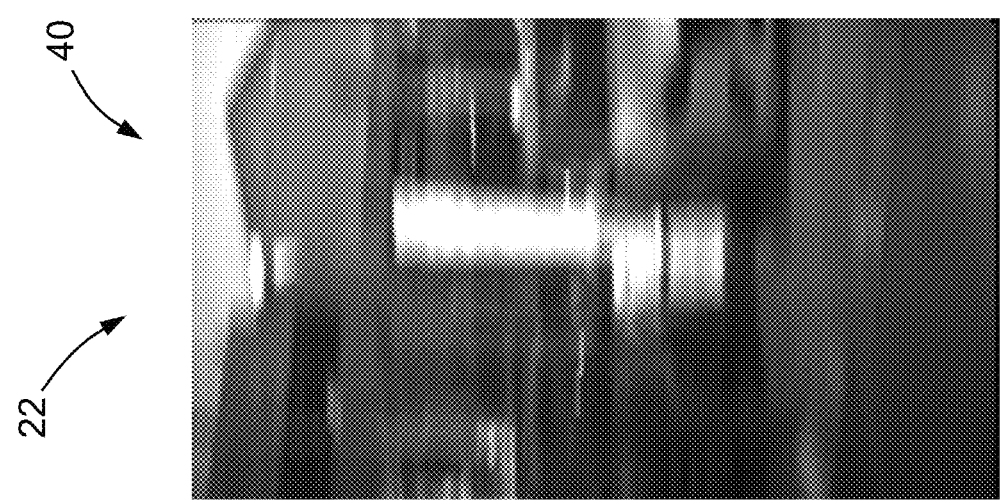
FIG. 1 is a blurred image taken by a camera in an optical system.

FIG. 1 shows a blurred image 22 taken by a camera 25 in an optical system 24, such as an LCPG-based camera. The blur 40 may have been caused in the image 22 due to movement of the camera 25, movement of the structure on which the camera 25 is mounted (e.g., an automotive vehicle), or from other causes. For example, the camera 25 which captured the image 22 may have been abruptly moved 100 pixels left or right during image capture. Also, for LCPG-based cameras, the blur 40 may be caused by the camera's polarized gratings, and the characteristics of such blur 40 (e.g., its magnitude, direction and/or periodicity) may be calculated from the camera's properties or from lab testing where the LCPG blur is measured. (Thus, for cameras 25 such as LCPG-based systems, the blur characteristics 40 caused by the camera 25 may be determined before the camera's use in the field; i.e., the blur characteristics 40 may be predetermined, and optionally stored in a memory for later retrieval.) By running the blurred image 22 through a filter 46 (such as a Tikhonov filter, a Wiener filter or another type of image processing filter), a filtered version of the blurred image 22 (i.e., a filtered image 48) may be produced, as shown in FIG. 2. Note that some parts of the filtered image 48 are made clearer (i.e., more sharpened, less blurred) by the filter 46, such as at the top and bottom of the image 48. However, other parts of the filtered image 48 may suffer from ringing artifacts 50, such as across the middle of the image 48. The occurrence of such ringing artifacts 50 are often exacerbated by the presence of over-saturated areas in an image, such as the generally vertical white area that can be seen in FIG. 1, which causes the periodically repeating vertical ringing artifacts 50 seen in FIG. 2. Note that the ringing artifacts 50 may occur at a regular spacing or period 62 across a first direction 52 in the filtered image 48 (i.e., pointing generally leftward and rightward, or generally horizontally, in FIG. 2). Thus, while passing a blurred image 22 through a filter 46 may remove blur 40 from some portions of the resulting filtered image 48, it may also introduce ringing artifacts 50 (as well as other noise) to other portions of the image 48.

Fortunately, this drawback of using certain filters 46 to process images may be overcome by the system 20 and method 100 of the present disclosure, which are effective for deblurring one or more blurred images 22.

As an example, FIG. 3 shows a deblurred version of the image of FIG. 2 (i.e., a deblurred image 32) after being processed by a deblurring CNN module 30 according to the aforementioned system 20 and method 100. Note that the blur 40 which was evident in the blurred image 22 of FIG. 1 has been dramatically reduced or removed in the deblurred image 32 of FIG. 3. Also note that the ringing artifacts 50 produced in the filtered image 48 of FIG. 2 have also been removed in the deblurred image 32 of FIG. 3. The system 20 and method 100 will now be described in detail, as follows below.

Figure 4:
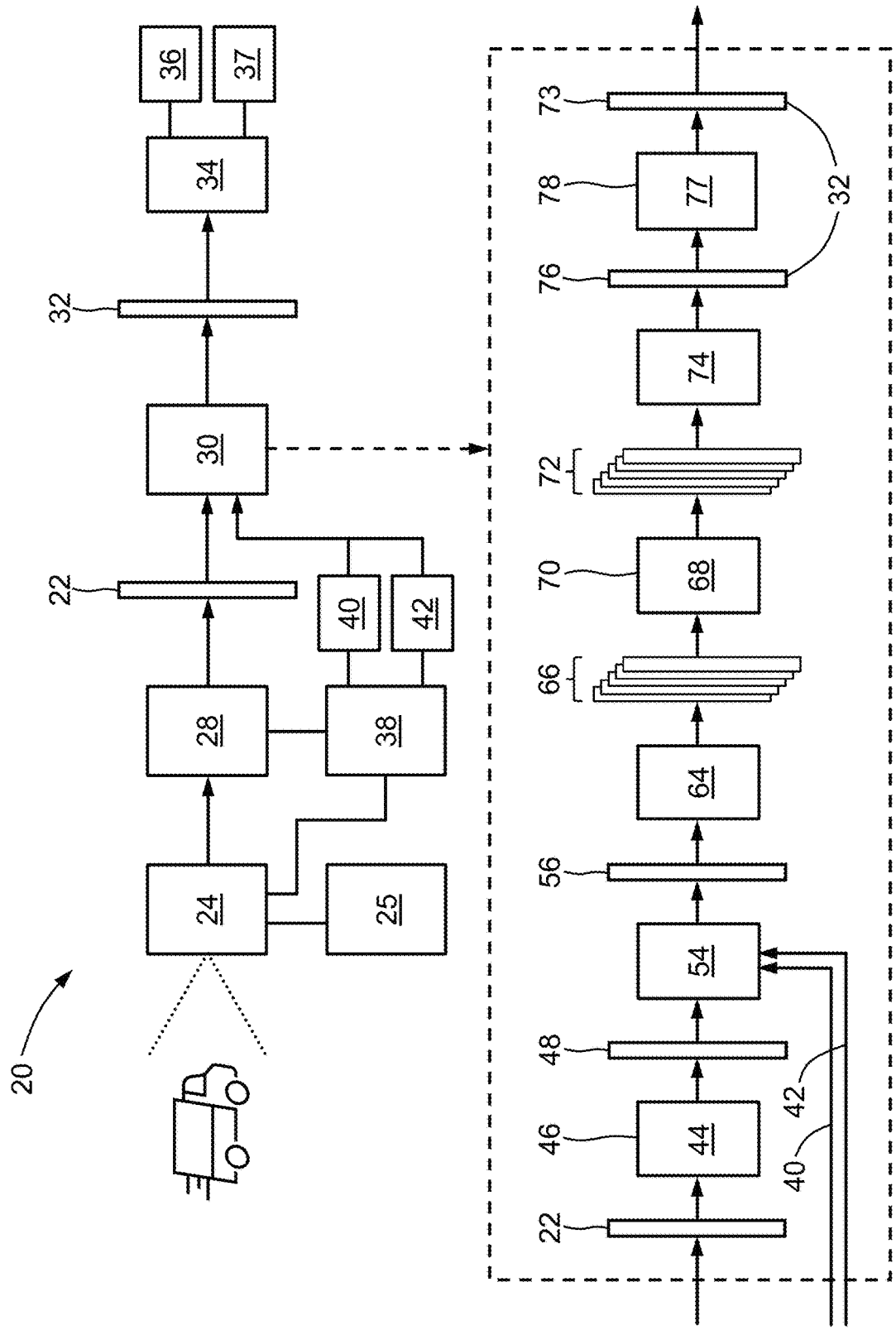
FIG. 4 is a block diagram of a system for deblurring according to the present disclosure, including an exploded view of the deblurring CNN module.

FIG. 4 shows a block diagram of the system 20 and its elements, including an exploded view of the deblurring CNN module 30 in particular. The system 20 for deblurring a blurred image 22 includes an optical system 24 including one or more cameras 25 configured for capturing a plurality of images 26, including one or more blurred images 22. The one or more cameras 25 may include various types of cameras and imaging sensors capable of receiving electromagnetic radiation to represent a view of the camera or sensor, including LCPG-based cameras, infrared-based cameras, light detection and ranging (LIDAR)-based sensors, and the like. An image signal processing (ISP) module 28 is operatively connected with the optical system 24 and is configured for receiving the plurality of images 26 (including the blurred image(s) 22) from the optical system 24. The ISP module 28 may optionally digitize the received images and/or may convert the received images into one or more digital signals for further digital processing.

The system 20 may further include an obtaining module 38 operatively associated with the optical system 24 and/or with the ISP module 28, and may be configured for obtaining blur characteristics 40 (relating to the blurred image 22 and/or attributable to the optical system 24) and/or for detecting a cause 42 capable of producing blur 40. For example, the obtaining module 38 may include or be connected to sensors which detect the location or movement of the one or more cameras 25 and/or the movement of mounting structures which the camera(s) 25 may be mounted on, thereby detecting any movement which may cause or produce blur 40. Additionally or alternatively, the obtaining module 38 may include hardware/software for digitally and directly obtaining blur characteristics 40 from one or more blurred images 22; for example, such an obtaining module 38 may be used to identify blur/blur characteristics 40 in an image or frame by comparing the image or frame with neighboring images or frames, and such identification of blur 40 may be used to identify the images containing such blur 40 as being a blurred image 22 and to characterize/quantify the blur characteristics 40. Further, the obtaining module 38 may obtain blur characteristics 40 that are attributable to the optical system/camera 24, 25 being used, such as predetermined blur characteristics 40 obtained from a memory or look-up table within the obtaining module 38 or from an external memory storage outside of the obtaining module 38. (These predetermined blur characteristics 40 would relate not only to the optical system/camera 24, 25 being used, but would also relate to the blurred image 22 and to the blur 40 produced in the image 22 by the optical system/camera 24, 25.) Moreover, the obtaining module 38 may obtain or determine a parameter derived from a blurring function and/or relating to the blurring of the blurred image 22. Here, the blurring function may be a mathematical or statistical description of how the camera 25 blurs or distorts images (e.g., because of the camera's polarized gratings), and the parameter may include the period/periodicity of the blur, the magnitude (e.g., number of pixels) of the blur, the direction of the blur as viewed in the blurred image 22, etc. (This blurring function or mathematical/statistical description may be determined during a previous calibration of the camera 25 or optical system 24.) This information gathered, obtained or deduced by the obtaining module 38 enables the source, cause and/or extent of the blurring to be known, thus facilitating so-called "non-blind" deblurring of the blurred images 22.

The system 20 also includes a deblurring convolutional neural network (CNN) module 30 which is operatively connected with the ISP module 28 and is configured for deblurring the blurred image 22 to produce a deblurred image 32 from the blurred image 22. (The deblurring CNN module 30 will be discussed in greater detail below.) Finally, the system 20 may further include a perception module 34 which is operatively connected with the deblurring CNN module 30 and is configured for utilizing the deblurred image 32 to arrive at one or more conclusions 36 and/or to take one or more actions 37 based on the deblurred image 32. In other words, the perception module 34 may use the deblurred image 32, including information about, within or deduced from the deblurred image 32, to reach a conclusion 36 (such as a conclusion regarding the content of the image 32) and/or to cause or take an action 37 (such as setting a flag, storing a value, triggering an alarm, etc.).

As shown in FIG. 4, the deblurring CNN module 30 may include a series of modules, with the input to the deblurring CNN module 30 being one or more blurred images 22 and the output being one or more corresponding deblurred images 32. (As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

Turning again to FIG. 4, the deblurring CNN module 30 may optionally include a filtering module 44, which may be configured for receiving the blurred image 22 and filtering or processing it through a filter 46, such as a Tikhonov regularization filter, a Wiener filter or another type of image processing filter. This filtering produces a filtered image 48 which may have ringing artifacts 50 repeating according to a particular period 62 along a first direction 52 in the filtered image 48, as mentioned above with reference to FIG. 2, and also shown schematically in FIG. 5.

Figure 6:
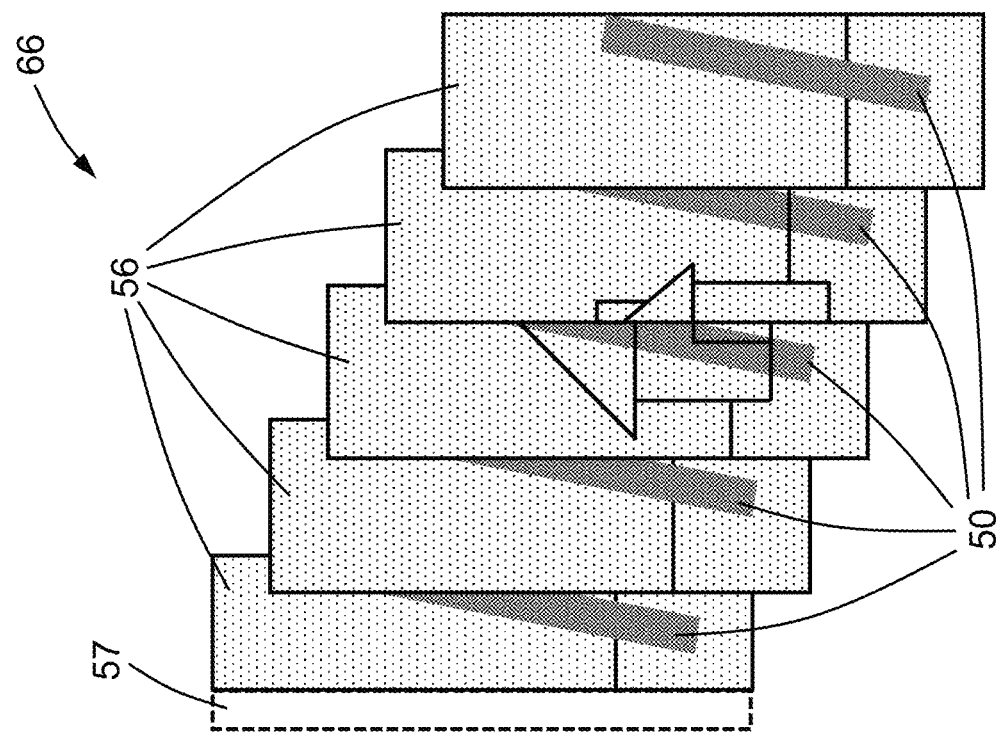
FIG. 6 is a schematic view of the filtered image of FIG. 5 after being divided and stacked.

Next, a dividing module 54 receives the filtered image 48 from the filtering module/filter 44, 46, and the dividing module 54 divides the filtered image 48 into a plurality of overlapping regions 56, as illustrated in FIG. 6. (Alternatively, the filtering module/filter 44, 46 may be skipped or bypassed, and the dividing module 54 may directly receive the blurred image 22 rather than a filtered image 48.) Each of the overlapping regions 56 has a uniform size 58 and also a uniform offset or spacing 60 from neighboring overlapping regions 56 as viewed along the first direction 52. (That is, the size of every overlapping region 56 is the same, and the amount of offset 60 from neighboring overlapping regions 56 is the same for every overlapping region 56.) Note that the size 58 and offset 60 are determined (e.g., by the dividing module 54) by the period 62 of a ringing artifact 50 in the blurred or filtered image 22, 48 (e.g., if a Tikhonov filter or other filter has been used), or by blur characteristics 40 (which may be obtained by the obtaining module 38) that relate to the blurred or filtered image 22, 48 and/or are attributable to the optical system 24, or by a detected cause 42 capable of producing the blur characteristics 40 (such as abrupt motion of the camera 25 detected or obtained by the obtaining module 38 during image capture). As illustrated in FIG. 4, the dividing module 54 may receive the blur characteristics 40 and/or cause 42 information from the obtaining module 38, along with information regarding the period 62 of any ringing artifacts 50 or other artifacts (which may be deduced or obtained by the obtaining module 38 or by the ISP module 28). When ringing artifacts 50 (or other periodically repeating artifacts) appear in a filtered image 48 (or in a blurred image 22), the offset 60 between neighboring overlapping regions 56 may be approximately equal to the period 62 of the ringing artifact 50 or other periodic artifact or a parameter derived from the blur characteristics 40, and the size 58 of each overlapping region 56 along the first direction 52 may be approximately equal to or greater than the period 62 of the ringing artifact 50/other artifact or the parameter derived from the blur characteristics 40.

Figure 5:
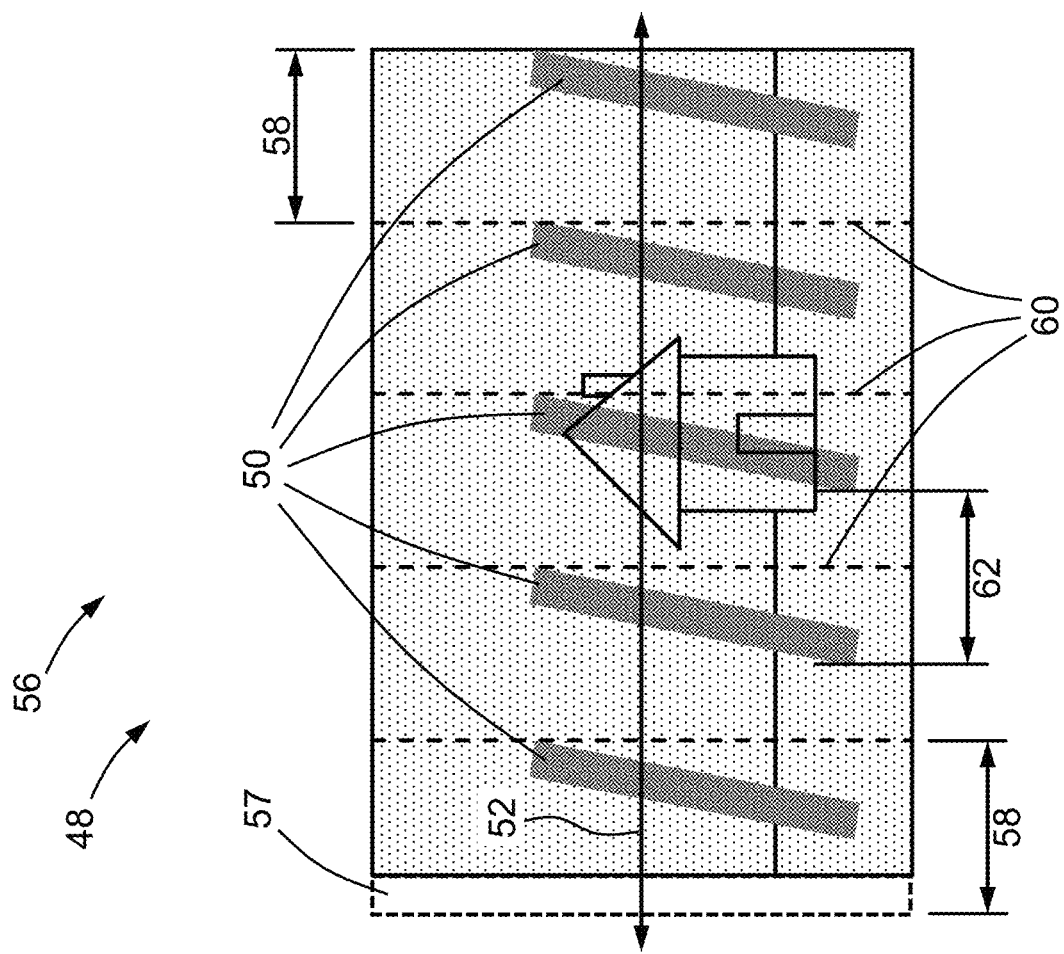
FIG. 5 is a schematic view of a filtered image after passing through a Tikhonov filter, showing ringing artifacts.

For example, in the schematized scene shown in FIG. 5, note that five ringing artifacts 50 are shown, with each appearing as a narrow vertical rectangle that is slightly tilted, and with the five rectangles/artifacts 50 spread across a first direction 52. A periodic spacing or period 62 separates the ringing artifacts 50, as shown by the spacing between the lower left corners of two neighboring rectangles/artifacts 50. Note that the scene has been divided into five equal regions 56 (referred to below as "overlapping regions"), as delineated by the vertical dashed lines, with the leftmost region 56 including a null area 57 added so that that region's width in the first direction 52 is equal to the width of the other regions 56. Also note that the vertical dashed lines may also represent an offset 60 from one region 56 to the next in the first direction 52. (Alternatively, the offset 60 may be viewed as a spacing between the vertical centerlines of neighboring regions 56.)

In FIG. 5, it can be seen that the size of each region 56 is determined by the period 62 of the ringing artifacts 50, because each of the regions 56 has a width as measured along the first direction 52 that is equal to the period 62. Further, the offset 60 from one region 56 to the next is also equal to the period 62. However, note that in some cases it may be desirable to maintain the offset 60 between regions 56 as being equal to the period 62, while increasing the size of each individual region 56 such that it is somewhat larger than the period 62. For example, if the ringing artifacts 50 have a period of 100 pixels, the width of each region 56 may be set as 130 pixels, which would be 15 pixels wider on the left and right sides than would be the case if the width of each region 56 were selected as being equal to the period 62 of 100 pixels. This would mean that for central regions 56 (i.e., regions 56 that are not a leftmost or rightmost region 56), a portion of each central region 56 on its left side would overlap with the neighboring region 56 to the left, and a portion of each central region 56 on its right side would overlap with the neighboring region 56 to the right. Also, a portion on the right side of the leftmost region 56 would overlap with the neighboring region 56 to the right of the leftmost region 56, and a portion on the left side of the rightmost region 56 would overlap with the neighboring region 56 to the left of the rightmost region 56. It may be noted that a similar type of approach may be utilized when raw or non-filtered blurred images 22 are used; in such a case, the size 58 and offset 60 of the overlapping regions 56 may be determined by periodic artifacts in the image 22 (if the image 22 has been filtered), or by blur characteristics 40 that are obtained relating to the image 22 and/or that are attributable to the optical system 24, or by a detected cause 42 that is attributed to producing the blur characteristics 40.

After the filtered image 48 has been divided into regions 56 by the dividing module 54, a stacking module 64 then organizes, arranges or "stacks" the plurality of overlapping regions 56 in a particular order to produce a stacked output 66, as illustrated by FIG. 6. Here, the regions 56 making up the stacked output 66 are shown fanned out with only a small amount of overlap between neighboring regions 56 so that each of the regions 56 can be seen, but the regions 56 may be arranged or "stacked" upon each other so that they fully overlap one another—hence, these regions 56 may then be referred to as "overlapping" regions 56. This fully overlapping arrangement of the overlapping regions 56 creates a sort of "cubic" arrangement of the overlapping regions 56, in which each ringing artifact 50 is "stacked" directly over or under its previously neighboring ringing artifact 50. The overlapping regions 56 are sequentially organized along the first direction 52 in this stacked output 66. For example, the leftmost region 56 of FIG. 5 may be a first or "bottom" region 56 in the stack, the neighboring region 56 immediately to the right of the leftmost region 56 may be stacked on top of the first/bottom region 56, and the stacking may continue along the first direction 52 (i.e., to the right, as viewed in FIG. 5) until the final or "top" region 56 in the stack is the rightmost region 56 of FIG. 5.

Once the overlapping regions 56 of the filtered image 48 have been stacked by the stacking module 64 into the stacked output 66, a convolving module 68 convolves or processes the stacked output 66 through a first t CNN 70, such as a U-net or other type of CNN. This produces a first CNN output 72 of stacked or ordered images which have reduced blur 40 as compared to the stacked output 66.

Figure 7:
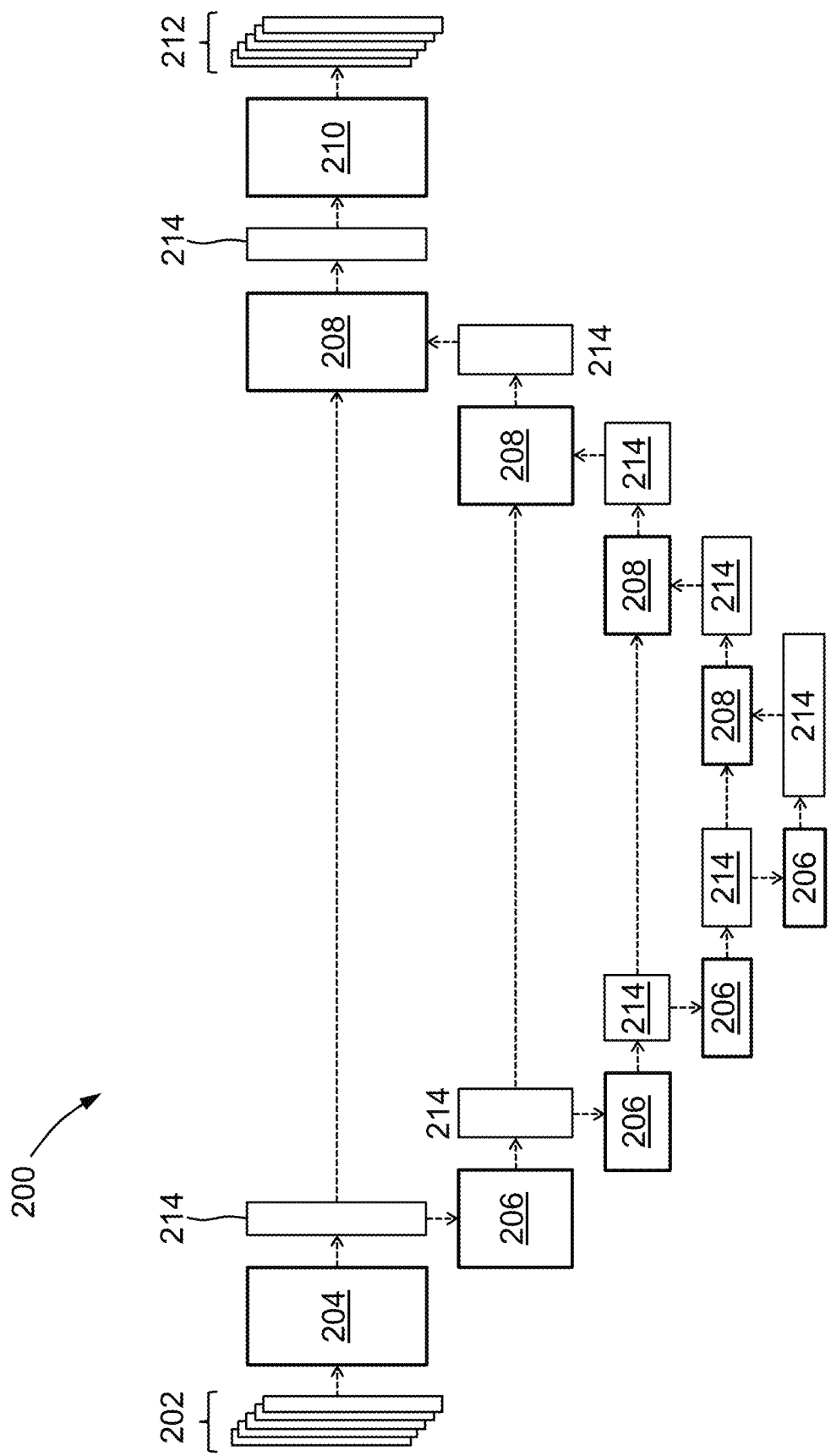
FIG. 7 is a block diagram of a U-net CNN.
Figure 8:
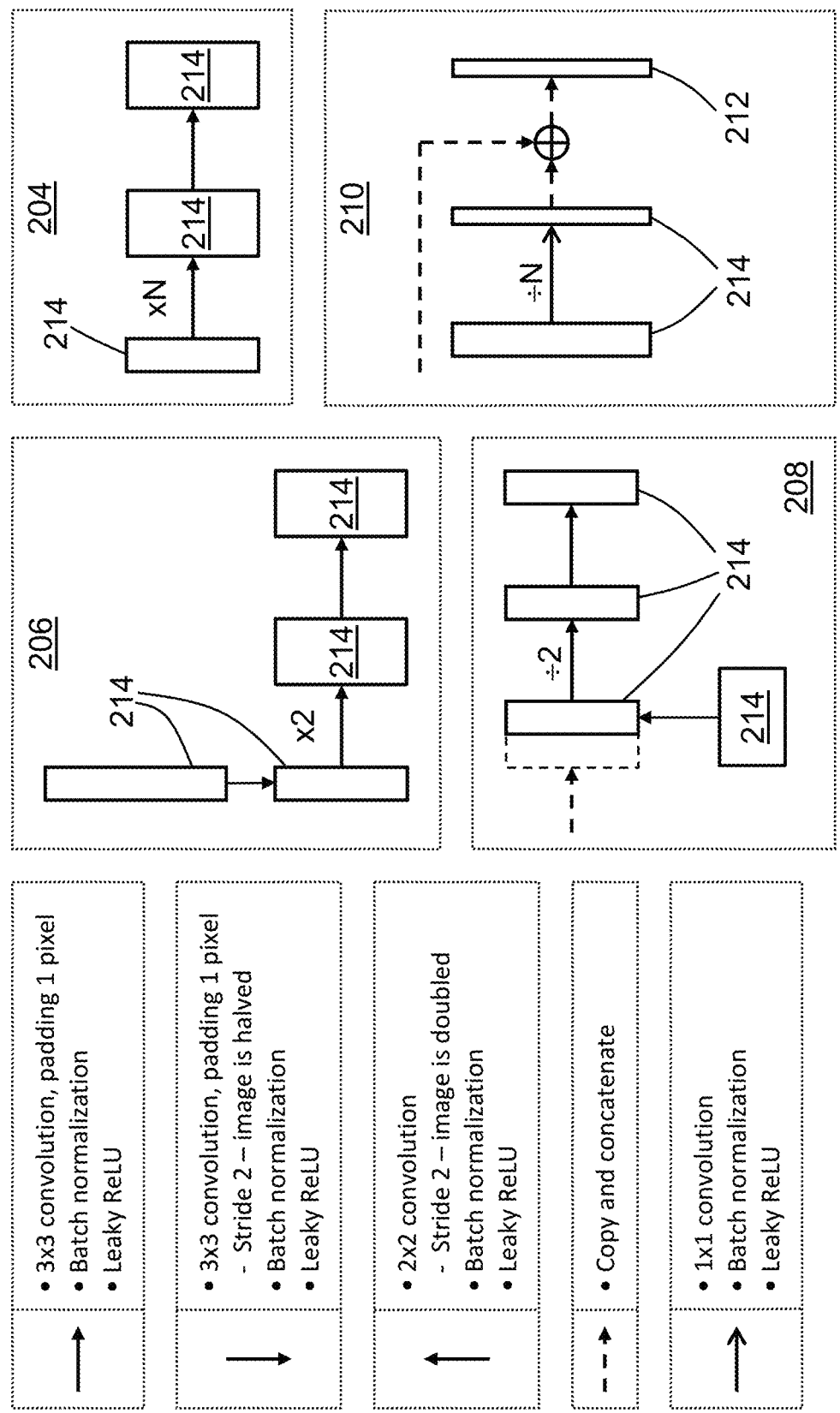
FIG. 8 is a visual dictionary for interpreting the U-net CNN of FIG. 7.

An exemplary 4-level U-net CNN architecture or structure 200 is shown in FIG. 7, and a visual dictionary for interpreting the blocks and arrows used in the U-net CNN structure 200 is provided in FIG. 8. The process flow through the U-net structure 200 will now be described as if the first and second CNNs 70, 78 (and therefore the convolving and processing modules 68, 77) each utilize a U-net structure 200. In FIG. 7, an input 202 is shown at the upper-left; this input 202 may be the stacked output 66 consisting of a plurality of stacked or ordered images/ overlapping regions 56 (which may be fed into the convolving module/first U-net CNN 68, 70), or the input 202 may be a single image (such as the re-assembled image 76, which may be fed into the processing module/second U-net CNN 77, 78). The input 202 enters a plane block 204, which is shown in the dictionary of FIG. 8 as a combination of 3×3 convolutions with a padding of one pixel, batch normalizations (BN), leaky rectified linear unit operations (ReLUs) and a multiplication/expansion of the number of channels by N (where N is an arbitrarily selected whole number). The resulting image or dataset 214 proceeds through an additional 3×3 convolution with a padding of one pixel (accompanied by BN and leaky ReLU), and then passes to a down block 206, which as shown by the dictionary includes a 3×3 convolution with a padding of one pixel and a stride of two in which the image is halved (accompanied by BN and leaky ReLU), followed by another 3×3 convolution with a padding of one pixel and a doubling of channels (accompanied by BN and leaky ReLU), and then another 3×3 convolution with a padding of one pixel (accompanied by BN and leaky ReLU). The resulting image/dataset 214 continues through additional down blocks 206 until the bottom (or fourth) level, whereupon the resulting image/dataset 214 then ascends through a series of up blocks 208 which contain a 2×2 deconvolution of stride two in which the image is doubled (accompanied by BN and leaky ReLU), a 3×3 convolution with a padding of one pixel in which the channels are halved (accompanied by BN and leaky ReLU), and then another 3×3 convolution with a padding of one pixel (accompanied by BN and leaky ReLU). Note that as the resulting image/dataset 214 ascends through the up blocks 208, selected previous resulting images/datasets 214 are copied and concatenated with the up blocks 208, as denoted by the dashed horizontal arrows shown in FIGS. 7-8 and the dashed rectangle shown in the up block 208 in FIG. 8. The resulting image/dataset 214 continues through additional up blocks 208 until the top (or first) level is reached, whereupon the resulting image/dataset 214 then proceeds through an additional 3×3 convolution with a padding of one pixel (accompanied by BN and leaky ReLU). After this, the resulting image/dataset 214 passes through a final block 210, which as shown in FIG. 8 includes a 3×3 convolution with a padding of one pixel (accompanied by BN and leaky ReLU) in which the number of channels is reduced to 1/N channels, followed by a conjoint or element-wise sum with the original input 202 to produce the final output 212.

Turning again to FIG. 4, after the convolving module/first CNN 68, 70 have produced the first CNN output 72, an assembling module 74 is used to assemble the multiple images of the first CNN output 72 into a single re-assembled image 76, and then an optional processing module 77 may be used to process the re-assembled image 76 through a second CNN 78 to produce a second CNN output 73. This processing or convolution of the re-assembled image 76 may produce the abovementioned deblurred image 32, with the result that the deblurred image 32 has reduced residual artifacts 79 as compared to the re-assembled image 76. These residual artifacts 79 may have been produced by the convolving module 68 during the convolution of the stacked output 66 through the first CNN 70, and/or by the stacking module 64 during the process of stacking the plurality of overlapping regions 56 to produce the stacked output 66, and/or by other modules and steps performed as part of the deblurring CNN module 30, with the effect that the processing module/second CNN 77, 78 act to reduce these residual artifacts 79. (The residual artifacts 79 themselves may include additional blur, smear and/or other artifacts not present in the initial blurred image 22 but which are subsequently added due to one or more modules/steps in the present system/method 20, 100.) Alternatively, if the optional second CNN 78 is not utilized, then the re-assembled image 76 produced by the assembling module 74 may be considered as the deblurred image 32. That is, the output of either the assembling module 74 (if no processing module/second CNN 77, 78 is used), or of the processing module/second CNN 77, 78, may be considered as the deblurred image 32.

Figure 11:
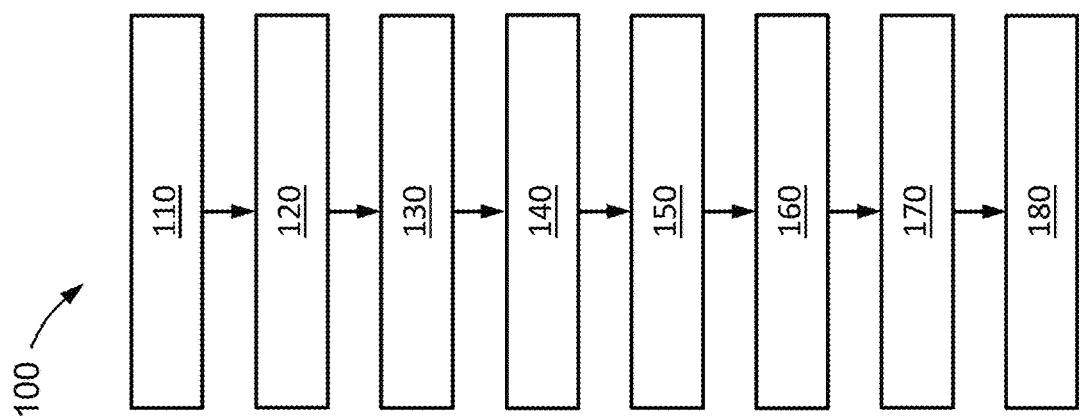
FIG. 11 is a flowchart of process steps for the method of deblurring a blurred image.

FIG. 11 shows a flowchart of process steps for a method 100 of deblurring a blurred image 22 captured by an optical system 24, which complements the system 20 for deblurring described above. (Note that while steps 110 through 180 are shown, one or more of these steps may be optional.) The method 100 may include: at block 120, optionally obtaining or detecting (i) blur characteristics 40 relating to the blurred image 22 and/or attributable to the optical system 24, and/or (ii) one or more causes 42 capable of or attributed to producing the blur characteristics at block 130, optionally filtering the blurred image 22 through a Tikhonov, Wiener or other filter 46 to produce a filtered image 48; at block 140, dividing the blurred or filtered image 22, 48 into a plurality of overlapping regions 56 each having a size 58 and an offset 60 from neighboring overlapping regions 56 along a first direction 52, wherein the size 58 and offset 60 are determined by a period 62 of a ringing artifact 50 in the blurred or filtered image 22, 48, or by obtained blur characteristics 40 relating to the blurred image 22, or by a detected cause 42 capable of producing the blur characteristics 40; at block 150, stacking the plurality of overlapping regions 56 to produce a stacked output 66, wherein the overlapping regions 56 are sequentially organized with respect to the first direction 52; at block 160, convolving the stacked output 66 through a first CNN 70 to produce a first CNN output 72 having reduced blur 40 as compared to the stacked output 66; at block 170, assembling the first CNN output 72 into a re-assembled image 76 (e.g., a deblurred image 32); and at block 180, optionally processing the re-assembled image 76 through a second CNN 78 to produce a second CNN output 73 (e.g., a deblurred image 32) having reduced residual artifacts 79 as compared to the re-assembled image 76.

In this embodiment, each of the overlapping regions 56 in the stacked output 66 may be processed in a respective separate channel 71 in the first CNN 70, and the blur 40 may be reduced in one dimension (e.g., in a horizontal direction) or in two dimensions (e.g., in both a horizontal direction and a vertical direction).

The first CNN 70 may have a first number of channels (e.g., four) and the second CNN 78 may have a second number of channels (e.g., six) that is different from the first number of channels. The residual artifacts 79 may be produced by the step of convolving the stacked output 66 through the first CNN 70 (e.g., at block 150), by the step of stacking the plurality of overlapping regions 56 to produce the stacked output 66 (e.g., at block 140), or by both steps.

The obtaining step (block 120) may be performed by an obtaining module 38, the filtering step (block 130) may be performed by a filtering module 44, the dividing step (block 140) may be performed by a dividing module 54, the stacking step (block 150) may be performed by a stacking module 64, the convolving step (block 160) may be performed by a convolving module 68, the assembling step (block 170) may be performed by an assembling module 74, and the processing step (block 180) may be performed by a processing module 77. Accordingly, the dividing module 54, the stacking module 64, the convolving module 68, and the assembling module 74 may be operatively connected to form a deblurring CNN module 30. Optionally, the deblurring CNN module 30 may also include the filtering module 44 and the processing module 77.

Figure 9:
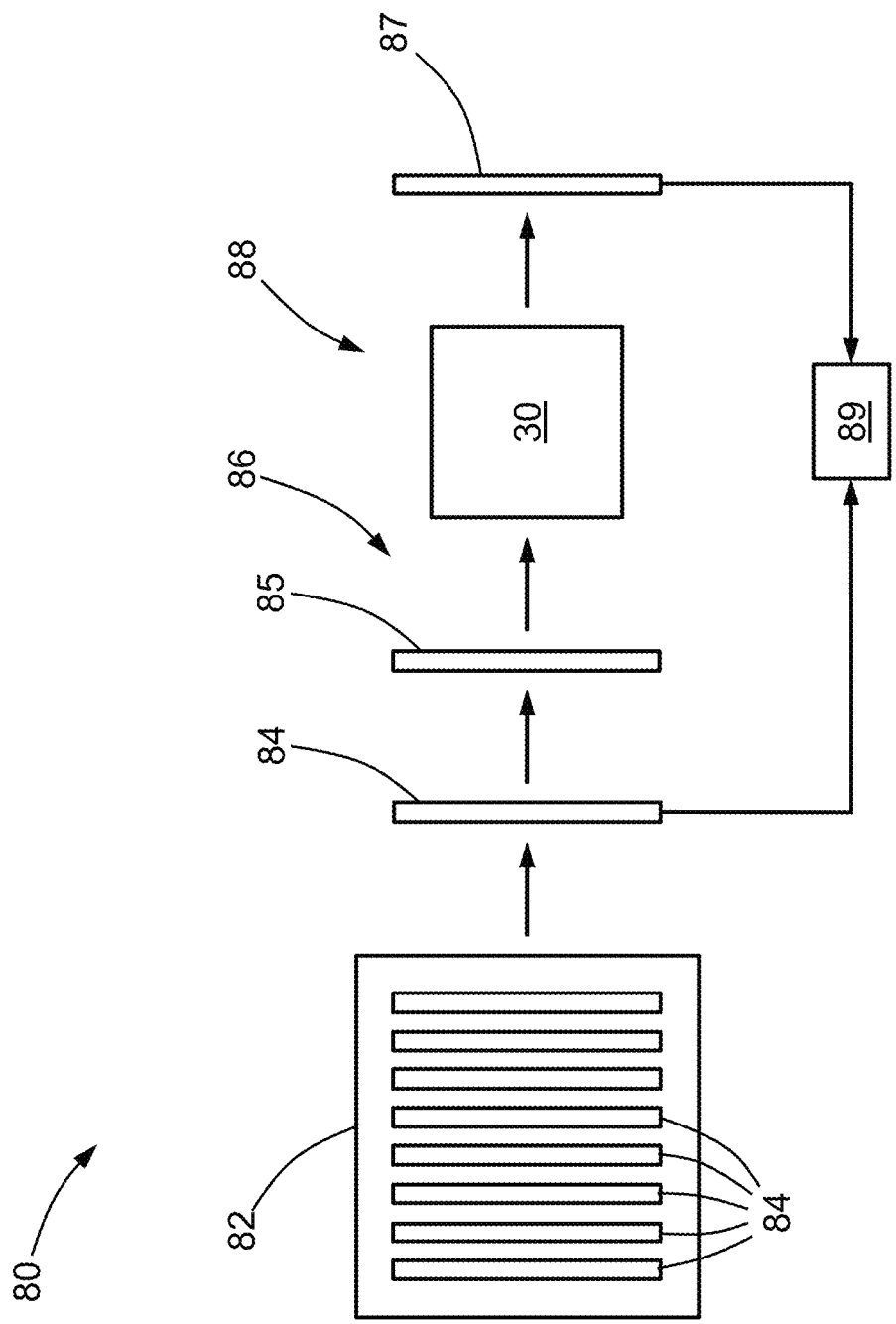
FIG. 9 is a block diagram of supervised training of the deblurring CNN module.
Figure 12:
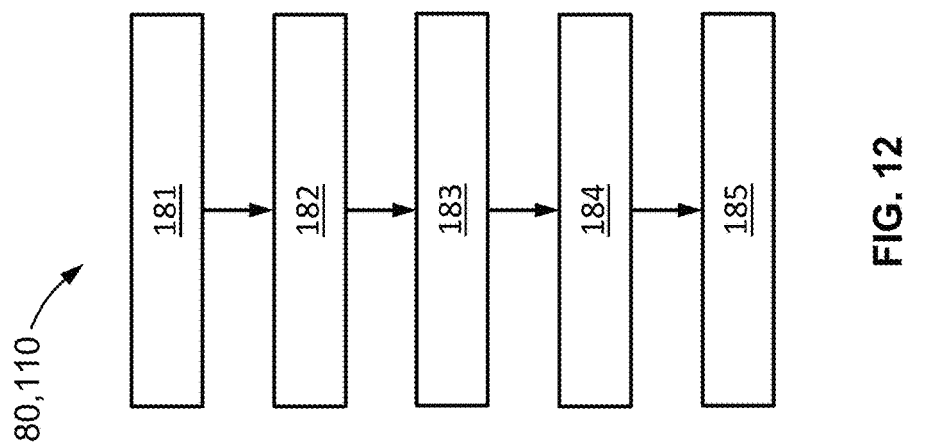
FIG. 12 is a flowchart of process steps for supervised training of the deblurring CNN module.

As shown in FIG. 11, the method 100 may further include, at block 110, a process of training the deblurring CNN module 30. One such process for training the deblurring CNN module 30 is by supervised training 80, which is illustrated in the block diagram of FIG. 9 and the flowchart of FIG. 12. The supervised training 80 may include: (i) at block 181, providing a database 82 of non-blurred stock images 84; (ii) at block 182, generating a synthetically blurred stock image 85 corresponding to each non-blurred stock image 84 using a blurring scheme 86; (iii) at block 183, producing a deblurred stock image 87 corresponding to each synthetically blurred stock image 85 using the deblurring CNN module 30 and a weighting scheme 88; (iv) at block 184, comparing each deblurred stock image 87 with the corresponding non-blurred stock image 84 to determine a difference 89 therebetween; and, (v) at block 185, repeating the generating, producing and comparing steps 182, 183, 184 utilizing varied blurring schemes 86 and weighting schemes 88 until the difference 89 is minimized.

Figure 10:
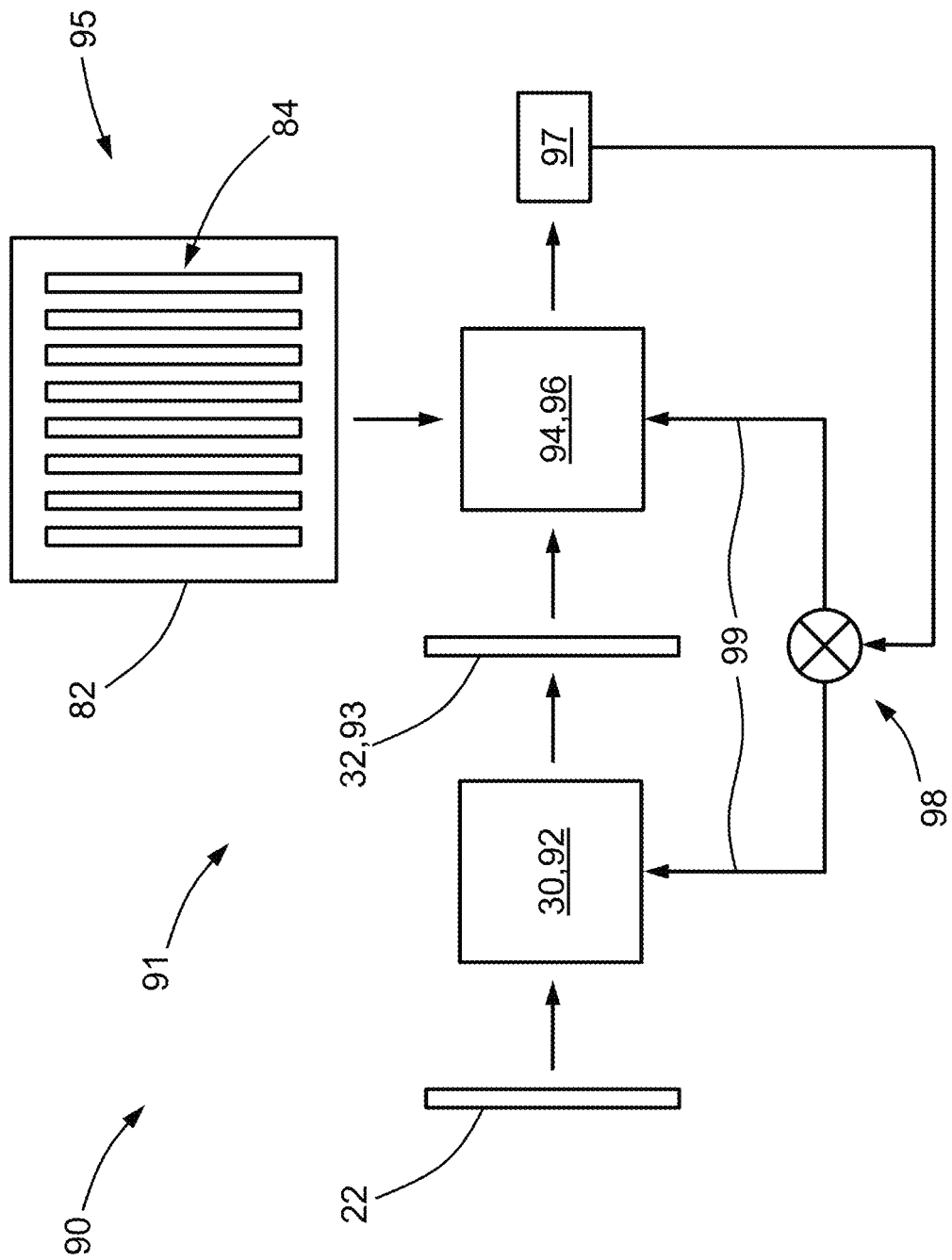
FIG. 10 is a block diagram of discriminative training of the deblurring CNN module.
Figure 13:
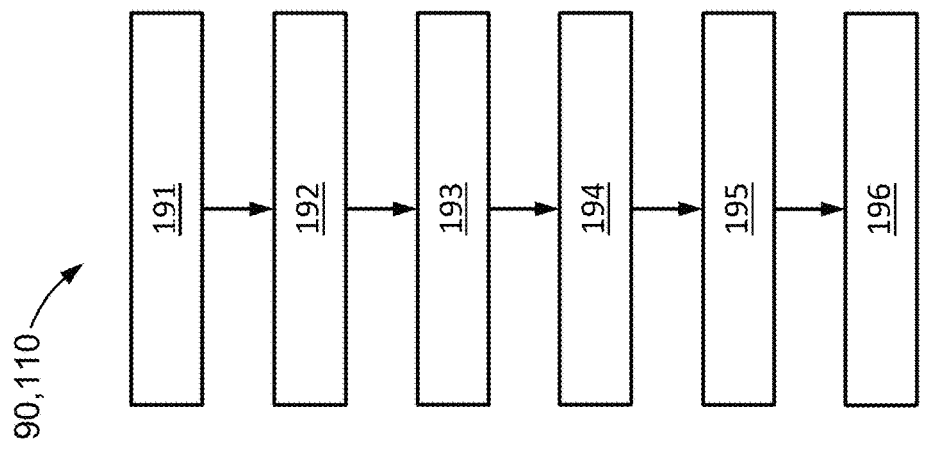
FIG. 13 is a flowchart of process steps for discriminative training of the deblurring CNN module.

Alternatively, the training step of block 110 may include training the deblurring CNN module 30 by discriminative training 90 in a generative adversarial network (GAN) 91, as illustrated in the block diagram of FIG. 10 and the flowchart of FIG. 13. The GAN 91 includes a generator 92 which provides one or more candidate data 93 to a discriminator 94, and the discriminator 94 receives the candidate data 93 and domain data 95. The discriminative training 90 may include: (i) at block 191, providing a database 82 of non-blurred stock images 84 as the domain data 95; (ii) at block 192, using the deblurring CNN module 30 as the generator 92; (iii) at block 193, supplying one or more deblurred images 32 as the candidate data 93 to the discriminator 94; (iv) at block 194, utilizing a deep neural network (DNN) 96 as the discriminator 94; (v) at block 195, receiving the one or more deblurred images 32 as the candidate data 93 and the non-blurred stock images 84 as the domain data 95; and, (vi) at block 196, discriminating between the candidate data 93 and the domain data 95 to produce discriminations 97 therebetween, wherein the generator 92 and the discriminator 94 compete with each other in a zero-sum game 98 of making adjustments 99 to either the generator 92 or the discriminator 94 based on the discriminations 97 until a predetermined degree of convergence is achieved between the generator 92 and the discriminator 94.

According to another embodiment, a method 100 for deblurring a blurred image 22 captured by an optical system 24 includes: (i) at block 120, obtaining, by an obtaining module 38, blur characteristics 40 relating to the blurred image 22 and/or attributable to the optical system 24, and/or a cause 42 capable of producing the blur characteristics 40; (ii) at block 130, filtering, by a filtering module 44, the blurred image 22 through a Tikhonov, Wiener or other filter 46 to produce a filtered image 48; (iii) at block 140, dividing, by a dividing module 54, the filtered image 48 into a plurality of overlapping regions 56 each having a size 58 and an offset 60 from neighboring overlapping regions 56 along the first direction 52, wherein the size 58 and offset 60 are determined by a period 62 of a ringing artifact 50 in the filtered image 48 or by the obtained blur characteristics 40 relating the blurred image 22 or by the detected cause 42; (iv) at block 150, stacking, by a stacking module 64, the plurality of overlapping regions 56 to produce a stacked output 66, wherein the overlapping regions 56 are sequentially organized along the first direction 52; (v) at block 160, convolving, by a convolving module 68, the stacked output 66 through a first U-net CNN 70 to produce a first CNN output 72 having reduced blur 40 as compared to the stacked output 66; (vi) at block 170, assembling, by an assembling module 74, the first CNN output 72 into a re-assembled image 76; and (vii) at block 180, processing, by a processing module 77, the re-assembled image 76 through a second U-net CNN 78 to produce the deblurred image 32, such that the deblurred image 32 has reduced residual artifacts 79 as compared to the re-assembled image 76. Here, the filtering module 44, the dividing module 54, the stacking module 64, the convolving module 68, the assembling module 74, and the processing module 77 are operatively connected to form a deblurring CNN module 30.

In this embodiment, the method 100 may further include training the deblurring CNN module 30 by supervised training 80, wherein the supervised training 80 may include: at block 181, providing a database 82 of non-blurred stock images 84; at block 182, generating a synthetically blurred stock image 85 corresponding to each non-blurred stock image 84 using a blurring scheme 86; at block 183, producing a deblurred stock image 87 corresponding to each synthetically blurred stock image 85 using the deblurring CNN module 30 and a weighting scheme 88; at block 184, comparing each deblurred stock image 87 with the corresponding non-blurred stock image 84 to determine a difference 89 therebetween; and, at block 185, repeating the generating, producing and comparing steps 182, 183, 184 utilizing varied blurring schemes 86 and weighting schemes 88 until the difference 89 is minimized.

Alternatively, the method 100 may further include training the deblurring CNN module 30 by discriminative training 90 in a generative adversarial network (GAN) 91, wherein the GAN 91 includes a generator 92 which provides one or more candidate data 93 to a discriminator 94 and wherein the discriminator 94 receives the candidate data 93 and domain data 95. The discriminative training 90 may include: at block 191, providing a database 82 of non-blurred stock images 84 as the domain data 95; at block 192, using the deblurring CNN module 30 as the generator 92 and, at block 193, supplying one or more deblurred images 32 as the candidate data 93 to the discriminator 94; and, at block 194, utilizing a deep neural network (DNN) 96 as the discriminator 94, at block 195, receiving the one or more deblurred images 32 as the candidate data 93 and the non-blurred stock images 84 as the domain data 95, and, at block 196, discriminating between the candidate data 93 and the domain data 95 to produce discriminations 97 therebetween, wherein the generator 92 and the discriminator 94 compete with each other in a zero-sum game 98 of making adjustments 99 to either the generator 92 or the discriminator 94 based on the discriminations 97 until a predetermined degree of convergence is achieved between the generator 92 and the discriminator 94.

While various steps of the method 100 have been described as being separate blocks, and various functions of the system 20 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like. And, the phrase "approximately equal to" as used herein may mean one or more of "exactly equal to", "nearly equal to", "equal to somewhere between 90% and 110% of" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method for deblurring a blurred image captured by an optical system, comprising:
    dividing the blurred image into a plurality of overlapping regions each having a size and an offset from neighboring overlapping regions along a first direction, wherein the size and offset are determined by a period of a ringing artifact in the blurred image if the blurred image has been filtered, or by obtained blur characteristics relating to the blurred image and/or attributable to the optical system, or by a detected cause capable of producing the blur characteristics;
    stacking the plurality of overlapping regions to produce a stacked output, wherein the overlapping regions are sequentially organized along the first direction;
    convolving the stacked output through a first convolutional neural network (CNN) to produce a first CNN output having reduced blur as compared to the stacked output; and
    assembling the first CNN output into a re-assembled image.

2. The method of claim 1, wherein the offset between neighboring overlapping regions is approximately equal to the period of the ringing artifact or a parameter derived from the blur characteristics, and wherein the size of each overlapping region along the first direction is approximately equal to or greater than the period of the ringing artifact or the parameter derived from the blur characteristics.

3. The method of claim 1, wherein each of the overlapping regions in the stacked output is processed in a respective separate channel in the first CNN.

4. The method of claim 1, further comprising:
    processing the re-assembled image through a second CNN to produce the deblurred image, wherein the deblurred image has reduced residual artifacts as compared to the re-assembled image.

5. The method of claim 4, wherein the first CNN has a first number of channels and the second CNN has a second number of channels that is different from the first number of channels.

6. The method of claim 4, wherein one or both of the first and second CNNs utilize a U-net CNN structure.

7. The method of claim 1, wherein the residual artifacts are produced by the step of convolving the stacked output through the first CNN and/or by the step of stacking the plurality of overlapping regions to produce the stacked output.

8. The method of claim 1, further comprising:
filtering the blurred image through a Tikhonov filter, a Wiener filter or another filter before the dividing step.

9. The method of claim 1, further comprising:
obtaining (i) the blur characteristics relating to the blurred image and/or attributable to the optical system and/or (ii) the cause capable of producing the blur characteristics.

10. The method of claim 1, wherein the dividing step is performed by a dividing module, the stacking step is performed by a stacking module, the convolving step is performed by a convolving module, and the assembling step is performed by an assembling module;
wherein the dividing module, the stacking module, the convolving module and the assembling module are operatively connected to form a deblurring CNN module.

11. The method of claim 10, wherein the filtering step is performed by a filtering module and the processing step is performed by a processing module, wherein the deblurring CNN module further includes the filtering module and the processing module.

12. The method of claim 10, further comprising:
training the deblurring CNN module by supervised training, wherein the supervised training includes:
providing a database of non-blurred stock images;
generating a synthetically blurred stock image corresponding to each non-blurred stock image using a blurring scheme;
producing a deblurred stock image corresponding to each synthetically blurred stock image using the deblurring CNN module and a weighting scheme;
comparing each deblurred stock image with the corresponding non-blurred stock image to determine a difference therebetween; and
repeating the generating, producing and comparing steps utilizing varied blurring schemes and weighting schemes until the difference is minimized; or
training the deblurring CNN module by discriminative training in a generative adversarial network (GAN), wherein the GAN includes a generator which provides one or more candidate data to a discriminator and wherein the discriminator receives the candidate data and domain data, wherein the discriminative training includes:
providing the database of non-blurred stock images as the domain data;
using the deblurring CNN module as the generator and supplying one or more deblurred images as the candidate data to the discriminator; and
utilizing a deep neural network (DNN) as the discriminator, receiving the one or more deblurred images as the candidate data and the non-blurred stock images as the domain data, and discriminating between the candidate data and the domain data to produce discriminations therebetween;
wherein the generator and the discriminator compete with each other in a zero-sum game of making adjustments to either the generator or the discriminator based on the discriminations until a predetermined degree of convergence is achieved between the generator and the discriminator.

13. A method for deblurring a blurred image captured by an optical system, comprising:
obtaining, by an obtaining module, blur characteristics relating to the blurred image and/or attributable to the optical system, and/or a cause capable of producing the blur characteristics;
filtering, by a filtering module, the blurred image through a filter to produce a filtered image;
dividing, by a dividing module, the filtered image into a plurality of overlapping regions each having a size and an offset from neighboring overlapping regions along a first direction, wherein the size and offset are determined by a period of a ringing artifact in the filtered image if the blurred image has been filtered, or by the obtained blur characteristics, or by the detected cause;
stacking, by a stacking module, the plurality of overlapping regions to produce a stacked output, wherein the overlapping regions are sequentially organized along the first direction;
convolving, by a convolving module, the stacked output through a first U-net convolutional neural network (CNN) to produce a first CNN output having reduced blur as compared to the stacked output;
assembling, by an assembling module, the first CNN output into a re-assembled image; and
processing, by a processing module, the re-assembled image through a second U-net CNN to produce a deblurred image having reduced residual artifacts as compared to the re-assembled image;
wherein the filtering module, the dividing module, the stacking module, the convolving module, the assembling module, and the processing module are operatively connected to form a deblurring CNN module.

14. The method of claim 13, further comprising:
training the deblurring CNN module by supervised training, wherein the supervised training includes:
providing a database of non-blurred stock images;
generating a synthetically blurred stock image corresponding to each non-blurred stock image using a blurring scheme;
producing a deblurred stock image corresponding to each synthetically blurred stock image using the deblurring CNN module and a weighting scheme;
comparing each deblurred stock image with the corresponding non-blurred stock image to determine a difference therebetween; and
repeating the generating, producing and comparing steps utilizing varied blurring schemes and weighting schemes until the difference is minimized; or
training the deblurring CNN module by discriminative training in a generative adversarial network (GAN), wherein the GAN includes a generator which provides one or more candidate data to a discriminator and wherein the discriminator receives the candidate data and domain data, wherein the discriminative training includes:
providing the database of non-blurred stock images as the domain data;
using the deblurring CNN module as the generator and supplying one or more deblurred images as the candidate data to the discriminator; and utilizing a deep neural network (DNN) as the discriminator, receiving the one or more deblurred images as the candidate data and the non-blurred stock images as the domain data, and discriminating between the candidate data and the domain data to produce discriminations therebetween;

wherein the generator and the discriminator compete with each other in a zero-sum game of making adjustments to either the generator or the discriminator based on the discriminations until a predetermined degree of convergence is achieved between the generator and the discriminator.

15. A system for deblurring a blurred image, comprising:
an optical system including one or more cameras configured for capturing a plurality of images including the blurred image;
an image signal processing module operatively connected with the optical system and configured for receiving the plurality of images including the blurred image from the optical system; and
a deblurring convolutional neural network (CNN) module operatively connected with the image signal processing module and configured for deblurring the blurred image to produce a deblurred image therefrom, wherein the deblurring CNN module comprises:
  a dividing module configured for dividing the blurred image into a plurality of overlapping regions each having a size and an offset from neighboring overlapping regions along a first direction, wherein the size and offset are determined by a period of a ringing artifact in the blurred image if the blurred image has been filtered, or by obtained blur characteristics relating to the blurred image and/or attributable to the optical system, or by a detected cause capable of producing the blur characteristics;
  a stacking module configured for stacking the plurality of overlapping regions to produce a stacked output, wherein the overlapping regions are sequentially organized along the first direction;
  a convolving module configured for convolving the stacked output through a first convolutional neural network (CNN) to produce a first CNN output having reduced blur as compared to the stacked output; and
  an assembling module configured for assembling the first CNN output into a re-assembled image.

16. The system of claim 15, further comprising:
a perception module operatively connected with the deblurring CNN module and configured for utilizing the deblurred image to arrive at one or more conclusions and/or to take one or more actions based on the deblurred image.

17. The system of claim 15, further comprising:
an obtaining module operatively associated with the optical system and/or the image signal processing module and configured for obtaining (i) blur characteristics relating to the blurred image and/or attributable to the optical system, and/or (ii) a cause capable of producing the blur characteristics.

18. The system of claim 15, wherein the deblurring CNN module further comprises:
a filtering module configured for filtering the blurred image through a Tikhonov filter, a Wiener filter or another filter.

19. The system of claim 18, wherein the deblurring CNN module further comprises:
a processing module configured for processing the re-assembled image through a second CNN to produce a second CNN output, such that the second CNN output has reduced residual artifacts as compared to the re-assembled image, and wherein one or both of the first and second CNNs utilize a U-net CNN structure.

20. The system of claim 15, wherein:
the deblurring CNN module is configured for supervised training, wherein the supervised training includes:
  providing a database of non-blurred stock images;
  generating a synthetically blurred stock image corresponding to each non-blurred stock image using a blurring scheme;
  producing a deblurred stock image corresponding to each synthetically blurred stock image using the deblurring CNN module and a weighting scheme;
  comparing each deblurred stock image with the corresponding non-blurred stock image to determine a difference therebetween; and
  repeating the generating, producing and comparing steps utilizing varied blurring schemes and weighting schemes until the difference is minimized; or
the deblurring CNN module is configured for discriminative training in a generative adversarial network (GAN), wherein the GAN includes a generator which provides one or more candidate data to a discriminator and wherein the discriminator receives the candidate data and domain data, wherein the discriminative training includes:
  providing the database of non-blurred stock images as the domain data;
  using the deblurring CNN module as the generator and supplying one or more deblurred images as the candidate data to the discriminator; and
  utilizing a deep neural network (DNN) as the discriminator, receiving the one or more deblurred images as the candidate data and the non-blurred stock images as the domain data, and discriminating between the candidate data and the domain data to produce discriminations therebetween;
wherein the generator and the discriminator compete with each other in a zero-sum game of making adjustments to either the generator or the discriminator based on the discriminations until a predetermined degree of convergence is achieved between the generator and the discriminator.

* * * * *